Patented July 13, 1943

2,324,079

UNITED STATES PATENT OFFICE 2,324,079

ADSORBENT MATERIAL

Herbert Hans Greger, Washington, D. C.

No Drawing. Application May 12, 1938,
Serial No. 207,642

14 Claims. (Cl. 210—205)

This invention relates to novel compositions of matter and methods of manufacturing the same, and to certain products which may be made from the former. While the material may find application in various industrial fields, it is especially effective as a filter for the physical or chemical (or both) removal of undesirable substances from fluids, and the present application is directed particularly to its use for that purpose.

The desirability of filter blocks, as distinguished from loose individual particles, has heretofore been appreciated in order to avoid the channeling, classification, attrition, etc., which usually accompany the use of such unconsolidated particles. However, difficulties have heretofore been experienced in forming filter blocks in that it has usually been necessary to first activate the loose particles, then bond them, and finally reactivate the bonded mass. Such a process is not only relatively involved and expensive, but there is an appreciable loss in the filtering efficiency of the individual particles.

Furthermore, the more desirable filter blocks of the past have been generally alkaline in reaction, which fact has detracted from their availability for the filtration of fluids containing organic acids, in that such acids react with the base to form soaps, with resulting emulsification and other difficulties.

To overcome the above disadvantages is one of the objects of this invention.

Another object of this invention is to provide a new composition of matter capable of various uses.

Still another object of this invention is to devise an economical process of manufacturing such material.

To accomplish the above, and other important objects as will hereinafter more fully appear, my invention in general embraces the concept of effectively bonding particles of an adsorbent material in such a manner that the adsorption efficiency of such particles is not appreciably impaired. More specifically, the finished product consists of particles of a dehydrated metallic oxide bonded together to provide a single unit in which such oxide and bonding medium provide a multiplicity of cells affording a large surface area. In the preferred method of manufacturing such a block, I mix together a hydrate of a metal and phosphoric acid, or compounds adapted to yield phosphoric acid, in such quantities that the metal hydrates are effectively bonded together; and such bonded product is subsequently dried and heated to a temperature to fully dehydrate and activate the metallic compound.

While the dehydrated oxides of several metals (such as aluminum, magnesium and iron) may serve as the adsorbent material, I shall describe my invention as applied to dehydrated alumina.

In the case of alumina filter block, I preferably start with the mineral bauxite which is composed principally of the dihydrate of alumina ($Al_2O_3.2H_2O$) with little or none of the mono and trihydrate, together with certain impurities consisting principally of hydrated iron oxide, titanium oxide and silica, which are mostly in the form of clay or kaolinite. These hydrates of course may be refined or purified chemical compounds if desired, but, for the sake of economy, I prefer to use a natural mineral, such as bauxite, wherever possible.

The bauxite, or other hydrate, is intimately mixed with the desired bonding material. Depending upon the quantity of the impurities and the properties of the particular bauxite, the amount of bonding material specified below may be varied in order to produce the desired strength of the bond.

The bonding material is preferably commercial phosphoric acid, $H_3PO_4$, in concentrated or dilute form. However, there may be readily substituted for such phosphoric acid any phosphoric acid-producing substance, such as any of its dehydration products, or the anhydrides of such acids which, by chemical reaction with water, form phosphoric acid. Likewise ammonium phosphate or any of the organic phosphates which yield phosphoric acid by calcination may be used, as well as any mineral that by chemical reaction yields phosphoric acid. An example of such a mineral is apatite which, on reaction with sulphuric acid, for instance, yields phosphoric acid and gypsum. In such a case, the gypsum, rather than proving deleterious, actually serves to strengthen the bonding of the adsorbent. As a matter of fact, even when phosphoric acid, or some phosphoric acid-producing compound, is used, I have sometimes found it of advantage to add a small amount of colloidal material, such as fuller's earth, bentonite, kaolinite, potter's clay, gypsum, or the like, for improvement of strength, in order to effect an economy where a relatively large amount of phosphoric acid would otherwise be needed.

The bauxite, or other metallic hydrate, is suitably sized and is mixed with the requisite amount of the particular bonding agent to form essentially a wet sand. The specific size of the filtration material and the amount of bonding agent, of course, varies with the properties of the materials and the uses to which the finished product is to be put, etc. Where phosphoric acid-producing compounds are used, the amounts are such as to give the required amount of phosphoric acid that is necessary in the particular operation.

Merely as illustrative of one set of conditions, I have used 100 grams of a good grade of Arkansas bauxite of 30–60 mesh size, and to this I have added 20 cubic centimeters of a 40% by weight solution of phosphoric acid. In another instance, I have used 100 grams of bauxite of minus 200 mesh screen size which was mixed with 30 c. c. of 30% phosphoric acid solution. In the latter case particularly, and depending on the properties of the bauxite, 5 grams of fuller's earth may be added to increase the strength of the bond.

I, of course, do not wish to be limited to any theory, but it is my belief that a chemical reaction takes place between the phosphoric acid and the metallic hydrate, and that a metallic phosphate is formed which serves as the final bonding agent. Inasmuch as there is no substantial loss in adsorption efficiency of the bonded product over the unbonded material, I believe that this metallic hydrate is porous, as well as the adsorbent itself. Of importance is the fact that the actual bonding material in the finished product is substantially neutral, and therefore the product may be readily used for the filtering of a fluid containing an organic acid. As indicated above, the use of my product in such a process obviates the formation of soaps and consequently avoids emulsification.

The mix of absorbent material and bonding agent will "set-up" upon standing, to form a uniform homogeneous mass resembling a rather viscous glue. This transformation may be accelerated by a slight heating, say to about 60° C.

The material, when thus set up, may then be molded to the necessary shape and form. The use to which the finished product is to be put will, of course, determine the shape of the molded form and the density of the product. Pressures of from 250 to 1,000 pounds per square inch may be used. While my invention is particularly adaptable for the formation of filter blocks or other relatively large units, it may be desirable to use the bonded material in the form of granular particles. In such a case, the shape of the molded product is immaterial, and for this purpose the agglomerated mix may be extruded through an extrusion press and subsequently broken up into short lengths or small particles. In this way ready extensive use can be made of fines, such as the 200 mesh product above mentioned.

After molding, or extrusion, as the case may be, the material may be dried at temperatures of from 100 to 150° C., although of course the molded or extruded product may be merely air dried to save fuel costs.

Partial or complete activation of the product may be effected by heating to a temperature of between 200 and 750° C. to dehydrate and thereby activate the adsorbent material. The exact temperature necessary will depend upon the precise type of bauxite used and the degree of activation desired. It is to be understood that my invention contemplates either partial activation (which may be obtained at the lower temperatures) or complete activation by heating to the higher range. Preferably, however, activation may be effected by rapidly heating the molded or extruded shapes to a temperature of approximately 700° C., for instance, through contact with hot combustion gases.

I have found that the hydrates of iron and magnesium behave in a practically identical manner to the aluminum hydrate described above, insofar as their bonding with phosphoric acid is concerned. Inasmuch as these metallic compounds are preferentially selective for certain substances, my invention contemplates not only the use of a single one of these compounds, but the admixture of several different compounds for particular filtration purposes. For instance, when the fluid to be treated contains organic sulphur compounds and organic acids, I may make up a filter block in which the filtering material is either entirely a magnesium compound, or, on the other hand, the filtering material may be a combination of a magnesium compound with bauxite, for instance.

The final product resulting from the above processes is a porous body of adsorbent materials bonded together, in which there are communicating voids or channels through which the fluid to be filtered may pass. The size of these channels may be determined by the size of the particles used. Such a product will act as a mechanical filter to remove dust, grit, carbon, and other solid matter. In addition, the body adsorbs and absorbs certain foreign matter in the fluids undergoing treatment.

While one of the principal advantages of my invention resides in the fact that I may initially bond an unactivated material, and subsequently activate the bonded mass, it is to be understood that I may bond a material that has been previously activated. In other words, bauxite may be initially heated to 360 to 750° C. to activate it, after which it is bonded by means of phosphoric acid, or phosphoric acid-producing compounds, and then the bonded body reactivated.

A variation of my process would be to bond the bauxite by means of a viscous glue-like mass formed by mixing phosphoric acid, or phosphoric acid-producing compounds, and bauxite fines (either activated or unactivated).

The advantages of my product for filtration purposes are believed to be apparent. There is provided a filtration body that removes undesirable constituents of a fluid by adsorption, by absorption, and by mechanical filtration. By proper selection of the metallic compound, a body may be produced for any desired condition of operation and generally to remove any particular type of foreign matter from the fluid.

The advantages of a filter block over unconsolidated particles are, of course, apparent, but of real significance is the ease and economy with which the present block is manufactured. The elimination of the necessity of activating the filtering medium preliminary to bonding means a saving in time, labor, equipment, and space, and also enhances the efficiency of the filter block.

The fact that the final bonded product is substantially neutral avoids emulsification when treating an organic acid-containing fluid, which heretofore has been a serious problem particularly in the filtration of certain hydrocarbons.

While the product of my invention possesses advantages of particular importance in the field of filtration, the effectiveness of the bonding and the properties of the bonded material render the product valuable for use as heat insulating brick, soundproofing tiles, wall board, and in various other industrial applications. In all such cases the mixed bonding material and the metallic compound, after "setting-up," are molded into the shapes desired for the particular use to which the product is put.

By "activated" and "unactivated" as appearing herein, I refer to the adsorptive activation (or unactivation) of the material in question, which, as previously pointed out, may be either partial or complete. Furthermore, in the appended claims the expression "adsorbent material," in the absence of specific qualification, is to be construed as embracing either a material that is actually activated or a material that, while not actually activated, is capable of being activated.

While for the purposes of clarity I have set forth in the foregoing specification certain specific materials, quantities, steps in the process, and uses of the product, it is of course obvious that various departures may be made therefrom without exceeding the bounds of my invention, and therefore the true scope of my invention is defined solely by the scope of the appended claims.

I claim:

1. A composition of matter comprising particles of an activated metallic oxide and a bond for said particles containing the phosphoric acid radical.

2. A composition of matter comprising particles of activated aluminum oxide and a bond for said particles containing the phosphoric acid radical.

3. A composition of matter comprising particles of activated magnesium oxide and a bond for said particles containing the phosphoric acid radical.

4. A composition of matter comprising particles of activated iron oxide and a bond for said particles containing the phosphoric acid radical.

5. A filter block comprising particles of an activated metallic oxide and a bond for said particles containing the phosphoric acid radical.

6. A filter block comprising particles of an activated magnesium oxide and a bond for said particles containing the phosphoric acid radical.

7. A filter block comprising particles of an activated iron oxide and a bond for said particles containing the phosphoric acid radical.

8. A method of forming a porous material comprising mixing an unactivated metallic compound with a bonding medium containing the phosphoric acid radical, shaping the resulting mix, and thereafter activating the shaped body.

9. A method of forming a porous material comprising crushing unactivated aluminum oxide, mixing the crushed material with a sufficient quantity of a material containing the phosphoric acid radical to effectively bond the crushed particles, shaping the bonded material, and thereafter activating the aluminum oxide.

10. A method of forming a porous material comprising crushing unactivated magnesium oxide, mixing the crushed material with a sufficient quantity of a material containing the phosphoric acid radical to effectively bond the crushed particles, shaping the bonded material, and thereafter activating the magnesium oxide.

11. A method of forming a porous material comprising crushing an unactivated iron oxide, mixing the crushed material with a sufficient quantity of a material containing the phosphoric acid radical to effectively bond the crushed particles, shaping the bonded material, and thereafter activating the iron oxide.

12. In a method of forming a porous material comprising mixing a metallic oxide with a material containing the phosphoric acid radical, and thereafter intermixing said mix with an adsorbent material.

13. A filter material comprising a mass of discrete particles, said particles being composed of an activated metallic oxide and a bonding medium containing the phosphoric acid radical.

14. A method of forming a porous material comprising mixing an unactivated metallic oxide with a clay-like material and a material containing the phosphoric acid radical, and thereafter activating the metallic oxide.

HERBERT H. GREGER.